UNITED STATES PATENT OFFICE 2,032,263

ARSENIC DERIVATIVES OF SUGARS

Paul J. Daughenbaugh, New Haven, Conn., assignor to Sharp & Dohme, Incorporated, Philadelphia, Pa., a corporation of Maryland No Drawing. Application February 9, 1932, Serial No. 591,931

8 Claims. (Cl. 260—14)

This invention relates to arsenic derivatives of sugars and more particularly to arsenic derivatives of glucose. The invention includes the new arsenic derivatives of glucose and also an improved method of producing them.

The invention relates in particular to arsenic derivatives of acetone sugars containing one or more acetone groups combined with the sugar molecule or nucleus, for example, arsenic derivatives of diacetone glucose and monoacetone glucose, the arsenic being combined with the sugar molecule or nucleus at some place other than that with which the acetone group or groups are combined.

In general the new arsenic derivatives of sugars contain the grouping R—O—As= where R represents the sugar, or acetone sugar, nucleus or residue, one of the carbon atoms of which is combined with the oxygen of the above formula. The new arsenic derivatives include arsenious acid and meta arsenite derivatives.

The new process of producing the new arsenic derivatives, for example, in the case of arsenic derivatives of glucose, involves the formation of the sodium salt of diacetone glucose by reaction of metallic sodium upon diacetone glucose in ether solution, treatment of the sodium salt of diacetone glucose with an arsenic halide such as arsenic tribromide to form an arsenic derivative containing bromine, and hydrolysis of the bromine-containing derivative to give an arsenious acid derivative of diacetone glucose which on dehydration forms the meta arsenite derivative of diacetone glucose. By splitting off one of the acetone groups from the diacetone glucose radical there is formed monoacetone glucose 3-meta arsenite, which may also be considered monoacetone glucose-3-arsenoxide.

In the production of arsenic derivatives of glucose I have found it advantageous to start with diacetone glucose where a definite mono derivative is desired since diacetone glucose has its free hydroxyl group in the three position, that is, on the third carbon atom, and it readily reacts with sodium to form a definite monosodium derivative which in turn readily reacts with arsenic tribromide with resulting substitution of the arsenic in the three position, thereby forming a definite monoarsenic derivative of glucose. The reactions involved are illustrated graphically by the following formulas of diacetone glucose, of the sodium derivative, and of the arsenic bromide derivative:

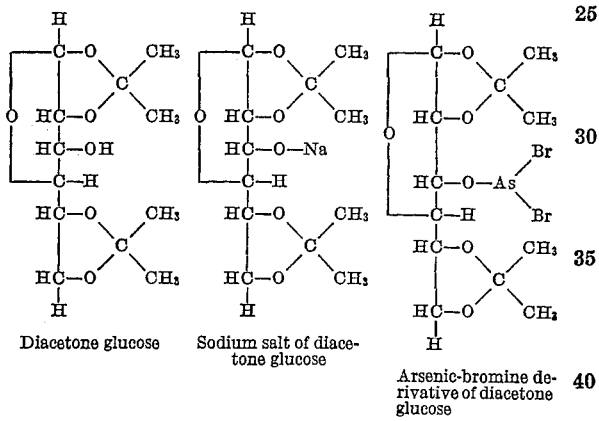

Diacetone glucose   Sodium salt of diacetone glucose   Arsenic-bromine derivative of diacetone glucose The arsenic-bromine derivative of diacetone glucose is easily hydrolyzed with removal of the bromine as hydrobromic acid and formation of the arsenious acid derivative of diacetone glucose, which, on losing one molecule of water and splitting off of one acetone group forms the 3-meta arsenite derivative of monoacetone glucose, as illustrated by the following formulæ:

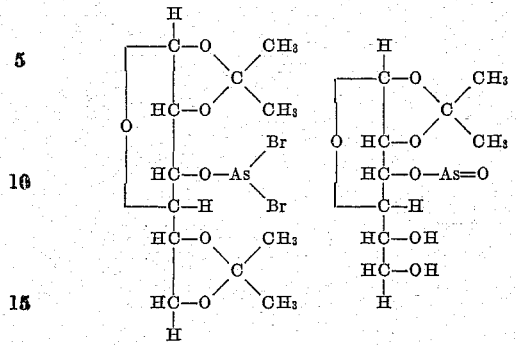

The invention will be further illustrated by the following specific example for the production of monoacetone glucose 3-meta arsenite from diacetone glucose.

Diacetone glucose in the purified state was used as the starting material. It was converted into the sodium salt by treating a solution of diacetone glucose in anhydrous ether with metallic sodium, for example, by dissolving 2 parts of diacetone glucose in about 10 parts of anhydrous ether, adding about 3 parts of sodium chips, and refluxing on a water bath until the reaction is completed or practically so. After cooling the excess sodium was removed.

The ether solution of the sodium salt of diacetone glucose was cooled to about the temperature of ice water and 4 parts of arsenic bromide dissolved in the least possible amount of dry ether added. Vigorous reaction took place and the mass solidified. 50 parts of ether were then added and the mixture warmed to room temperature, when most of the material dissolved, leaving a fine precipitate of sodium bromide which was removed by filtration.

The following equation illustrates the reaction between the excess of arsenic tribromide and the sodium salt of diacetone glucose with resulting formation of the arsenic-bromine derivative of diacetone glucose.

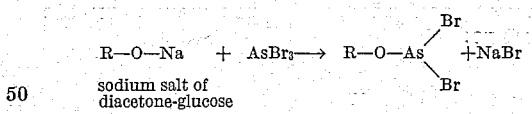

R in the above equation represents the diacetone glucose radical or residue.

The arsenic-bromine derivative is readily hydrolyzed, and this hydrolysis takes place on standing if moisture is not rigidly excluded from the reaction mixture, this hydrolysis being illustrated by the following equation.

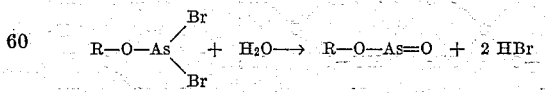

The hydrogen bromide formed by this reaction, in the presence of moisture, gave a concentration of hydrogen ions sufficient to split off one of the acetone groups from the molecule, thus converting the diacetone glucose derivative to monoacetone glucose 3-meta arsenite.

This treatment of the reaction product produced as above described was carried out by filtering the mixture to remove sodium bromide, extracting the residue with ether, and evaporating the ether from the solution. When most of the ether had evaporated a quantity of transparent needle-shaped crystals separated from the solution. The crystals were removed by filtration and a second crop soon formed. The ether was then further evaporated and about fifty parts of absolute ethyl acetate added and the reaction mixture was refluxed with fresh sodium, filtered when cool, and a still further crop of crystals separated from the solution. The melting point of the crystals separated in each case was 193–194°. The product was recrystallized from dry ethyl ether.

The monoacetone glucose 3-meta arsenoxide thus produced has the following graphically illustrated formula:

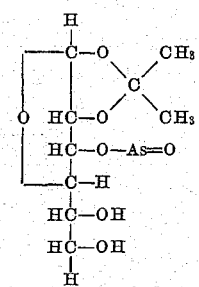

If in carrying out the above example great care is taken to dry all reagents and to exclude atmospheric moisture, the intermediate arsenic-bromine derivative is formed but the crystalline product could not be isolated. However, mild hydrolysis of this arsenic-bromine derivative in ether solution converted it into the crystalline monoacetone glucose 3-meta arsenite.

This product is a valuable crystalline product which is moderately soluble in all of the ordinary organic solvents as well as in water. It is not decomposed by water at ordinary temperatures and may be crystallized from this solvent unchanged. The aqueous solution has a neutral reaction and possesses strong reducing properties. The compound is quite stable in dilute acids and alkalies at ordinary temperature, but is readily hydrolyzed with an alcoholic solution of potassium hydroxide yielding monoacetone glucose and potassium arsenite.

The monoacetone glucose arsenite has valuable therapeutic properties, being stable and readily soluble in water and therefore readily administered in water solution.

It will be noted that the arsenic is not directly combined with carbon in the monoacetone glucose arsenite but is combined with the carbon through oxygen.

Insofar as I am aware I am the first to produce any arsenic derivatives of sugars in which the arsenic is combined with the sugar molecule in this way, and also the first to produce arsenite derivatives of sugars. Other arsenic derivatives of other sugars than glucose can be similarly prepared by the same general procedure hereinbefore described.

I claim:
1. As new products, trivalent compounds of acetone glucose having the arsenic united through oxygen to the third carbon atom of the glucose, and having the arsenic also attached to another oxygen atom by a double bond.
2. As new products, arsenite compounds of acetone glucose having the arsenic united to the third carbon atom and having at least one acetone radical also combined with the glucose.
3. As a new product, monoacetone glucose-3-meta-arsenite, being a crystalline compound having a melting point of about 193–194° C., being readily soluble in water and organic solvents.

4. The method of producing arsenic compounds of sugars which comprises causing a sodium salt of a sugar to react with an arsenic halide.

5. The method of producing arsenic compounds of sugars which comprises causing a sodium salt of a sugar to react with an arsenic halide, and hydrolyzing the resulting arsenic-halide compound to form an arsenite compound of the sugars.

6. The method of producing arsenic compounds of sugars which comprises treating a sodium salt of an acetone sugar with an arsenic halide and hdyrolyzing the resulting arsenic-halogen compound.

7. The method of producing arsenic compounds of glucose which comprises treating the sodium salt of diacetone glucose with an arsenic halide to form the arsenic-halogen compound of the acetone glucose.

8. The method of producing arsenic compounds of glucose which comprises treating the sodium salt of diacetone glucose with an arsenic halide to form the arsenic-halogen compound of the acetone glucose and hydrolyzing the arsenic-halogen compound to form an arsenite compound of the acetone glucose.

PAUL J. DAUGHENBAUGH.